Dec. 31, 1957  R. N. ECK ET AL  2,818,150
CONTROL SYSTEM FOR POWER PRESSES HAVING A
MAGNETIC FLUX CLUTCH-BRAKE DRIVE
Filed Sept. 23, 1955  3 Sheets-Sheet 1

Inventors.
Robert N. Eck
Verne H. Dimson
By H. R. Rather
Attorney

United States Patent Office 2,818,150
Patented Dec. 31, 1957

2,818,150

CONTROL SYSTEM FOR POWER PRESSES HAVING A MAGNETIC FLUX CLUTCH-BRAKE DRIVE

Robert N. Eck, Whitefish Bay, and Verne H. Simson, Milwaukee, Wis., assignors to Cutler-Hammer, Inc., Milwaukee, Wis., a corporation of Delaware Application September 23, 1955, Serial No. 536,130

6 Claims. (Cl. 192—144)

This invention relates to a control system for power operated forming presses having a magnetic flux clutch-brake drive.

A primary object of the invention is to provide an improved control system of the aforementioned type which affords selectively single cycle operation, "inching" operation either with the driving motor energized or the flywheel coasting, and flywheel braking under emergency stop conditions.

A more specific object is to provide increased safety in such a control system by requiring that all of a plurality of clutch control relays pick up before the clutch can be energized, that dropout of any one of such relays will insure deenergization of the clutch, and that pick-up of any one of a plurality of brake relays will insure energization of the magnetic flux brake.

Another specific object is to provide in such a control system means for delaying energization of the magnetic flux brake for a predetermined interval pending deenergization and discharge of clutch control winding together with means insuring energization of the magnetic flux brake in the event of malfunctioning of the delaying means.

An additional specific object is to provide in connection with the drive and control system an electromagnetically releasable friction brake which is automatically set in the event of release of the single cycle initiating switch at any point in the down stroke of the press ram, and in the event of failure of power to the control circuits.

A further specific object is to provide for normal setting of the friction brake as an incident to drop out of any one of the clutch control relays at the end of a press operating cycle, and to provide means insuring setting of that brake in the event all of the clutch control relays fail to drop out.

A still further object is to provide automatic stopping of the drive motor, deenergization of the clutch, energization of the magnetic flux brake and setting of the friction brake, either in the event of failure of the nonrepeat relay to drop out, or in the event of failure of any one of the brake control relays to drop out after single cycle operation has been initiated.

Other objects and advantages of the invention will hereinafter appear.

The accompanying drawings illustrate a preferred embodiment which will now be described in detail, it being understood that the embodiment illustrated is susceptible of various modifications in respect of details without departing from the scope of the appended claims.

Figure 1:
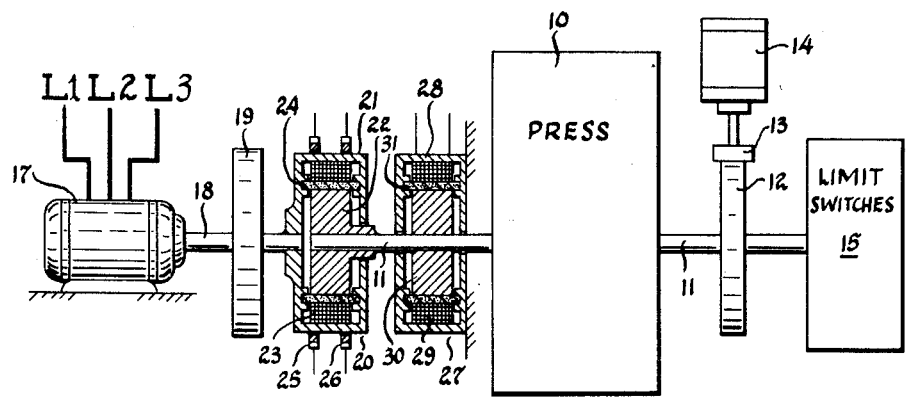
Figure 1 is a schematic showing of a power press and drive control apparatus therefor.

In Fig. 1, there is shown a power press 10, which may be assumed to have a reciprocating ram attached to a crank arm (not shown) that is driven by a shaft 11. A friction brake comprising a drum 12 fixed on shaft 11, a brake shoe 13 and an electromagnetic release coil 14 for shoe 13 is adapted to hold shaft 11 and the ram parts driven thereby in stationary position when coil 14 is deenergized. A group of limit switches, generally designated 15 and to be described hereinafter in more detail in connection with Figs. 2 and 3, may be assumed to be operated by shaft 11.

A polyphase A. C. motor 17 is provided to drive shaft 11 through a shaft 18, an inertia flywheel 19 mounted on shaft 18, and an electromagnetic flux clutch 20 which is preferably of the magnetic particle type. The clutch 20 has a driving member 21 nonrotatably secured on shaft 18, a driven member 22 nonrotatably secured on shaft 11, a control coil 23 secured in place on member 21, a magnetic particle mixture 24 disposed in the annular space between member 22 and member 21 and slip rings 25 and 26 connected to the ends of coil 23. Clutch 20 provides driving torque transmission between shafts 18 and 11 in accordance with the degree of energization of its control coil 23.

An electromagnetic flux brake 27, which is also preferably of the magnetic particle type, applies retarding torque on shaft 11. It comprises a stationarily mounted member 28, a control coil 29 mounted on member 28, a member 30 nonrotatably secured on shaft 11, and a magnetic particle mixture 31 disposed in the annular space between members 28 and 30. The degree of braking or retarding torque applied on shaft 11 depends on the degree of energization of control coil 29.

Figure 2:
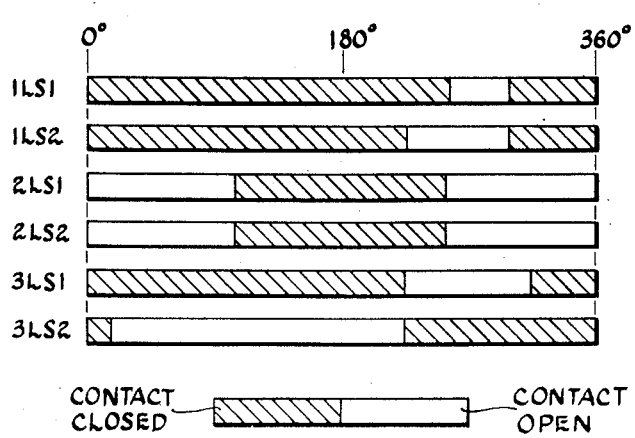
Fig. 2 is a schedule depicting the sequence and deviation of operation of certain control apparatus.
Figure 3:
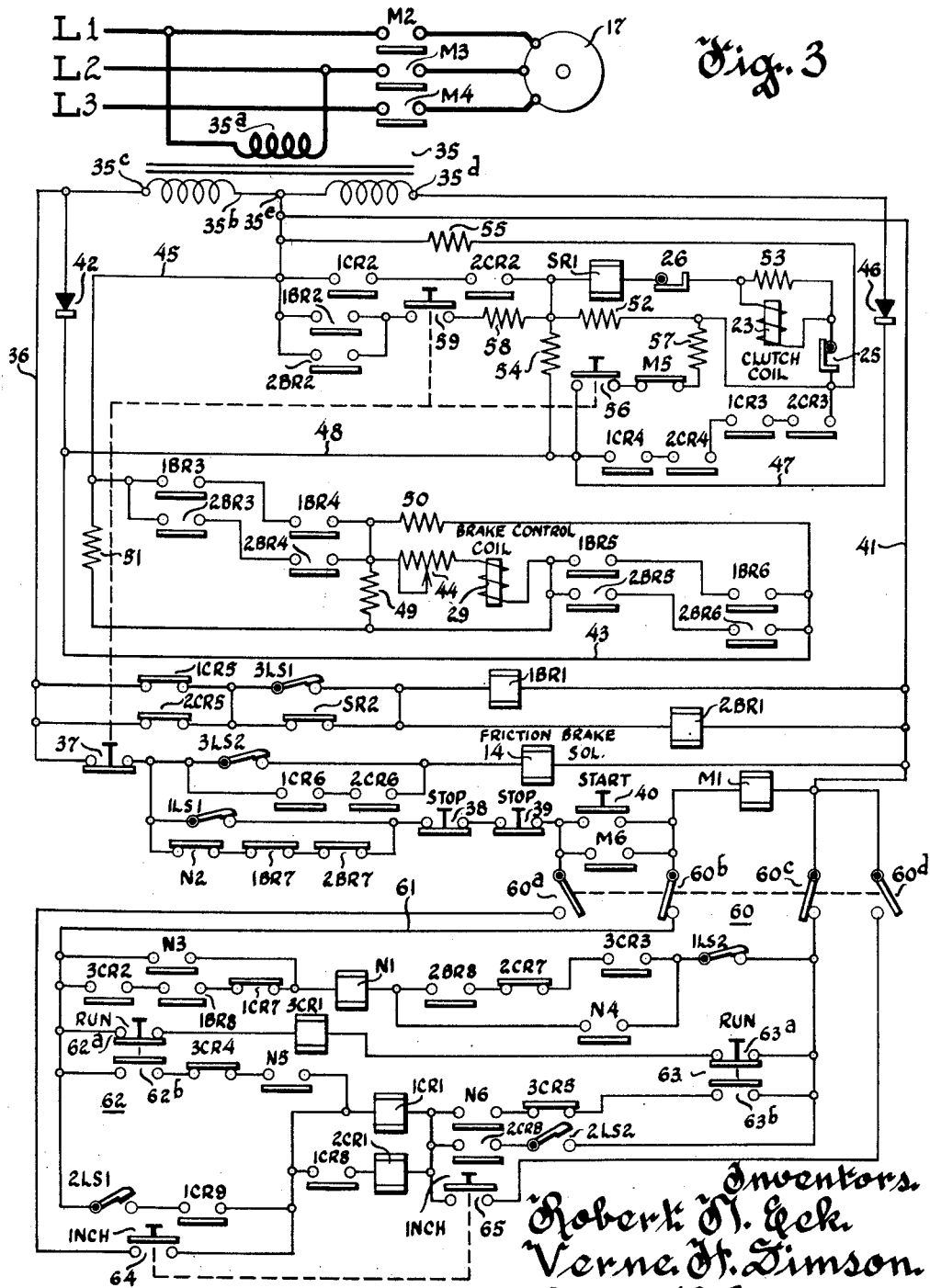
Fig. 3 is a diagrammatic showing of a coordinated control system for the apparatus of Fig. 1.
Figure 4:
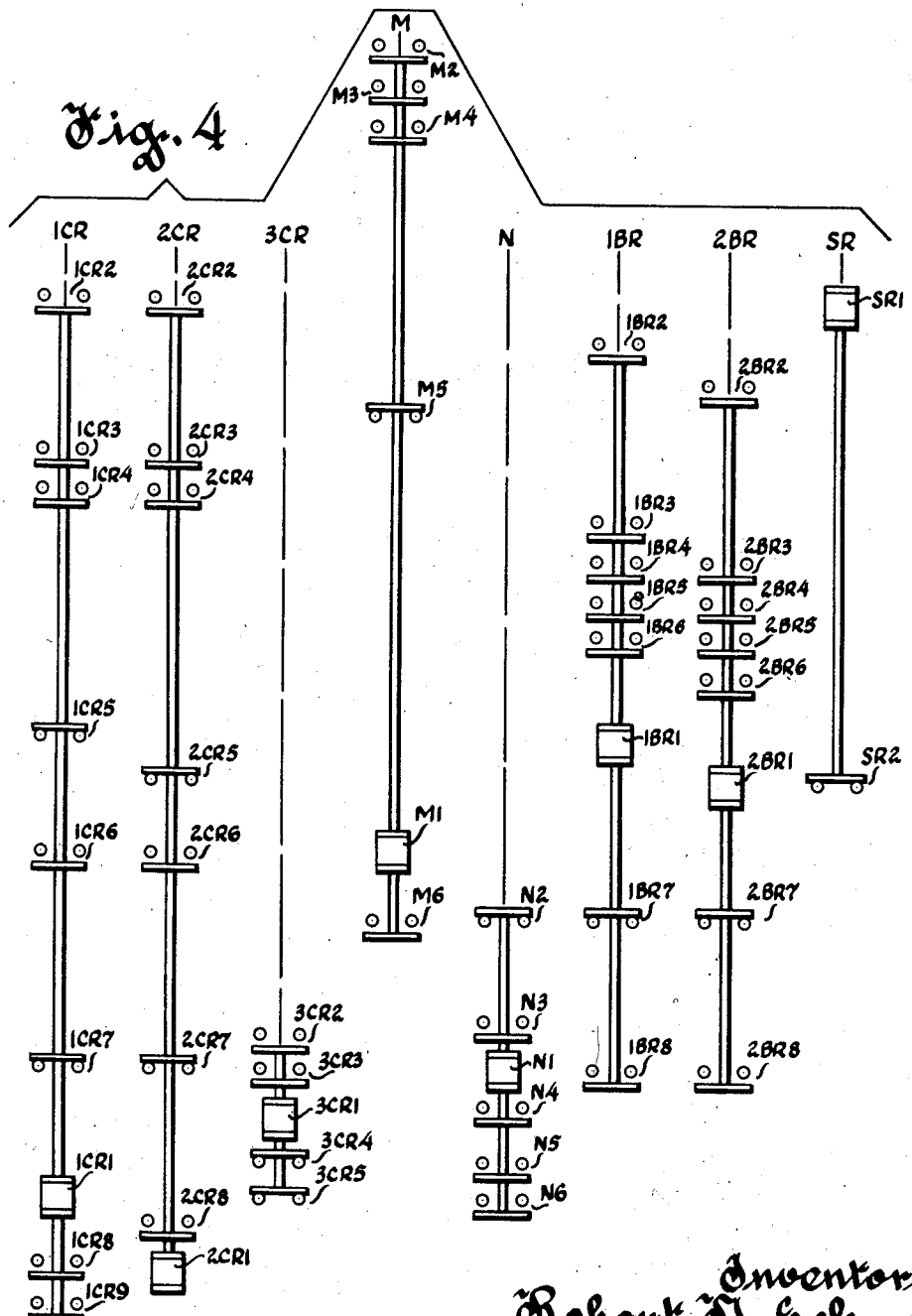
Fig. 4 is a schedule of contactors and relays shown in Fig. 3 with their operating coils and associated contacts in alinement.

Figs. 2, 3 and 4 disclose the control system affording an improved coordinated control of motor 17, clutch 20, brake 27 and friction brake 12—14 which will now be described in detail. Fig. 2 discloses the operating schedule for limit switches 1LS1, 1LS2, 2LS1, 2LS2, 3LS1 and 3LS2, which may be assumed to be operated in a predetermined sequence by shaft 11 as it rotates to drive the press ram through an operating cycle, and which perform certain control functions in the control system to be described in connection with Figs. 3 and 4. The cross hatched and clear horizontal areas to the right of each designated limit switch in Fig. 2 depict closed and open operating positions, respectively, for that particular switch.

As shown in Fig. 3, contacts M2, M3 and M4 of an electromagnetic contactor M are adapted to close upon energization of an operating coil M1 to connect motor 17 to supply lines L1, L2 and L3 of a polyphase A. C. supply source. Control circuit voltage is afforded by a transformer 35 which has a primary winding 35ª connected across supply lines L1 and L2 and a secondary winding 35ᵇ having end terminals 35ᶜ and a center tap terminal 35ᵉ.

End terminal 35ᶜ of winding 35ᵇ is connected through a conductor 36, a normally closed push-button switch 37, limit switch 1LS1, normally closed push-button "stop" switch 38 and 39, a normally open push-button "start" switch 40, operating coil M1 of contactor M and a conductor 41 to center-tap terminal 35ᵉ. Contacts N2 of a non-repeat relay N and contacts 1BR7 and 2BR7 of brake relays 1BR and 2BR, respectively, are connected in series and together in parallel across limit switch 1LS1. If transformer 35 is alive and switch 40 is closed it will be apparent that an energizing circuit will be established for coil M1 to afford the aforementioned connection of motor 17 to the A. C. supply and thus drive shaft 18 and flywheel 19. Auxiliary contacts M6 connected in parallel across switch 40 provide a maintaining circuit around the latter so it may be released after momentary closure to energize coil M1. Limit switch 1LS1 opens momentarily at a certain point in the press cycle, and if all of the series connected contacts N2, 1BR7 and 2BR7 are not then closed the energizing circuit for motor 17 will be interrupted to stop drive of shaft 18 and flywheel 19 and energizing circuits for clutch relays and non-repeat N which will hereinafter be described will also be interrupted.

The release coil 14 for the friction brake is connected across conductors 36 and 41 in series with switch 37, and either through limit switch 3LS2, or through the series connected normally open contacts 1CR6 and 2CR6 of clutch relays 1CR and 2CR which are connected in parallel with limit switch 3LS2. With conductors 36 and 41 alive limit switch 3LS2 initially completes the energizing circuit for coil 14, and after clutch relays 1CR and 2CR pick up as will hereinafter be explained, contacts 1CR6 and 2CR6 close to maintain the energizing circuit for coil 14 when limit switch 3LS2 opens and remains open during the downward stroke of the press ram. In the event either of clutch relays 1CR and 2CR fail to pick up the following opening of limit switch 3LS2 at a predetermined point in the press operating cycle immediate setting of the friction brake 12—14 is effected.

Operating coil 1BR1 of brake relay 1BR and operating coil 2BR1 of brake relay 2BR are connected across conductors 36 and 41 in series with the parallel combination of limit switch 3LS1 and the normally closed contact SR2 of a series relay SR, and in series with the parallel combination of normally closed contacts 1CR5 of clutch relay 1CR and the normally closed contacts 2CR5 of clutch relay 2CR. Thus, when conductors 36 and 41 are initially made alive coils 1BR1 and 2BR1 will be energized to effect closure of contacts 1BR2 to 1BR6 and 1BR8 and contacts 2BR2 to 2BR6 and 2BR8 and opening of contacts 1BR7 and 2BR7 of relays 1BR and 2BR, respectively. Closure of 1BR3 to 1BR6 and 2BR3 to 2BR6 completes an energizing circuit for control coil 29 of magnetic particle brake 27. During alternate half cycles of alternating voltage current will then flow from end terminal 35$^c$ through a half-wave rectifier 42 through either contacts 1BR6 and 1BR5, or through contacts 2BR6 and 2BR5 which are connected in parallel with contacts 1BR6 and 1BR5, through control coil 29 and an adjustable resistor 44, through either contacts 1BR4 and 1BR3, or contacts 2BR4 and 2BR3 which are connected in parallel with contacts 1BR4 and 1BR3, and through a conductor 45 to center-tap terminal 35$^e$ of winding 35$^b$. During the other half-cycle of alternating voltage current will flow from end terminal 35$^d$ through a half-wave rectifier 46, through conductors 47 and 48, through contacts 1BR6 and 1BR5 or 2BR6 and 2BR5, coil 29, etc., to center-tap terminal 35$^e$. The paralleling of contacts 1BR6 and 1BR5 with 2BR6 and 2BR5 and contacts 1BR3 and 1BR4 with 2BR3 and 2BR4 insures that brake coil will be energized in the event one of the brake relays 1BR and 2BR should fail to pick up. The degree of braking torque applied on shaft 11 by brake 27 can be adjusted within limits by means of adjustable resistor 44.

Opening of both of the contacts 1CR5 and 2CR5 effects deenergization of coils 1BR1 and 2BR1 to interrupt the energizing circuit for brake control coil 29. Residual inductive current stored in coil 29 will then discharge through adjustable resistor 44 and a resistor 49 which is connected in parallel across coil 29 and adjustable resistor 44. Following such discharge, coil 29 is subjected to a small demagnetizing reverse current by current flowing through either of the rectifiers 42 and 46, conductor 43, a resistor 50, adjustable resistor 44, control coil 29, a resistor 51, and conductor 45 to center tap terminal 35$^e$.

Clutch control coil 23 is connectable through its slip ring 25 to the junction between conductors 47 and 48 which lead from rectifiers 46 and 42, respectively, by closure of the series connected normally open contacts 1CR4, 2CR4, 1CR3 and 2CR3 of clutch relays 1CR and 2CR. Coil 23 is connectable at its other end through its slip ring 26 in series with the operating coil SR1 of series relay SR to center-tap terminal 35$^e$, upon closure of normally open contacts 1CR2 and 2CR2 of clutch relays 1CR and 2CR. The closure of contacts 1CR2 to 1CR4 of relay 1CR and contacts 2CR2 to 2CR4 of relay 2CR depends upon energization of operating coils 1CR1 and 2CR1 which will be hereinafter described. It will be observed that the series arrangement of the last mentioned clutch relay contacts requires that both clutch relays pick up before energizing connection for control coil 23 can be completed and that drop-out of either clutch relay will insure that coil 23 will be deenergized.

Following opening of the last mentioned contacts of clutch relays 1CR and 2CR to interrupt the energizing connections to coil 23, any residual inductive current in the latter discharges through coil SR1 and a resistor 52 which is connected in parallel across coil 23 and coil SR1. This insures that coil SR1 is maintained energized for an interval to delay closure of contacts SR2 and energization of coils 1BR1 and 2BR1 of brake relays 1BR and 2BR, thereby delaying energization of brake control coil 29 of the magnetic particle brake 27. Ultimately contacts SR2 close to effect such reenergization of brake relays 1BR and 2BR, but in the event relay SR should fail to drop out and close contacts SR2, reclosure of limit switch 3LS1 toward the end of the press ram operating cycle will insure such energization of the brake relays.

Following the aforedescribed discharge of clutch control coil 23, it is subjected to a small demagnetizing reverse current by current flowing through either of the rectifiers 42 and 46, conductor 48 or conductor 47, through a resistor 54, which is connected to the point common between conductors 47 and 48 and the point common between coil SR1 and resistor 52, through coils SR1 and 23, and through a resistor 55, which is connected between center-tap terminal 35$^e$ and the point common between contacts 2CR3 and coil 23, to center-tap terminal 35$^e$.

In the event of opening of circuit through either of the slip rings 25 or 26, a relatively high ohmic resistor 53 directly connected across coil 23 provides an auxiliary discharge path for the latter.

A normally open push-button switch 56 is connected at one side to the point common between conductors 47 and 48 and at its other side is connected in series with normally closed auxiliary contacts M5 of contactor M and a resistor 57 to the point common between resistor 52 and clutch control coil 23. A resistor 58 is connected at one end to the point common between contacts 2CR2, coil SR1 and resistors 52 and 54 and at its other end in series with a normally open push-button switch 59, and either of the normally open contacts 1BR2 and 2BR2 of brake relays 1BR and 2BR to center tap terminal 35$^e$. Switches 56 and 59 are mechanically connected to switch 37 in a manner such that opening of the latter switch, which as will be apparent effects deenergization of motor 17 and setting of friction brake 12—14, will effect closure of switches 56 and 59. The closure of switches 56 and 59 completes energizing connections for clutch control coil 23 from either of rectifiers 42 or 46 through switch 56, contacts M5, resistors 57, coil 23, coil SR1, resistor 58, switch 59, either of contacts 1BR2 and 2BR2 to center-tap terminal 35$^e$. The coupling afforded by clutch 20 will be insufficient to cause drive of the press ram, but sufficient to afford rapid braking of the then coasting shaft 18 and flywheel 19. The inclusion of auxiliary contacts M5 in the last mentioned circuit insures that flywheel braking cannot be obtained until motor 17 is deenergized.

An "inch-run" selector switch, generally designated 60 and having contacts 60$^a$, 60$^b$, 60$^c$ and 60$^d$, when operated to "run" position (in which its contacts 60$^b$ and 60$^c$ are closed and its contacts 60$^a$ and 60$^d$ are open) completes a circuit from the point common between switch 40, contacts M6 and coil M1 through a conductor 61, normally closed contact 62$^a$ of a "run" push-button switch 62, coil 3CR1 of a relay 3CR, normally closed contacts 63$^a$ of a "run" push-button switch 63, contacts 60$^c$ and conductor 41 to center-tap terminal 35$^e$. Thus, whenever conductors 36 and 41 are alive coil 3CR1 will be energized to close its contacts 3CR2 and 3CR3 and open its contacts 3CR4 and 3CR5. Accordingly, an energizing circuit for operating coil N1 of a non-repeat relay will be completed from conductor 61 through the then closed contacts 3CR2, 1BR8 and 1CR7, coil N1, the then closed contacts 2BR8, 2CR7 and 3CR3, limit switch 1LS2 and contacts 60$^c$ to conductor 41. Energization of coil N1 results in opening of its associated contacts N2 and in closure of its contacts N3 to N6. Closure of contacts N3 provides a circuit maintaining connection for coil N1 across the series connected contacts 3CR2, 1BR8 and 1CR7, and closure of contacts N4 provide a similar maintaining connection for coil N1 across the series connected contacts 2BR8, 2CR7 and 3CR3. As will be hereinafter more fully explained, limit switch 1LS2 opens at a certain point in the press operating cycle to deenergize coil N1.

If switches 62 and 63 are operated to close their contacts 62$^b$ and 63$^b$ and open their contacts 62$^a$ and 63$^a$, coil 3CR1 is deenergized to permit reclosure of its associated contacts 3CR4 and 3CR5. Consequently an energizing circuit will be completed for coils 1CR1 of clutch relay 1CR from conductor 61 through contacts 62$^b$, 3CR4 and N5, coil 1CR1 contacts N6, 3CR5 and 63$^b$ and 60$^c$ to conductor 41. Closure of contacts 1CR8 follows and as a result an energizing circuit for coil 2CR1 of clutch relay 2CR is completed in parallel with coil 1CR1. The energization of coils 1CR1 and 2CR1 results in completion of the aforedescribed energizing connections for control coil 23 of the magnetic particle clutch 23, due to closure of contacts 1CR2 to 1CR4 and 2CR2 to 2CR4, and results in the deenergization of coils 1BR1 and 2BR1 of brake relays 1BR and 2BR to afford deenergization of coil 29 of the magnetic particle brake 27 as a result of opening of contacts 1BR3 to 1BR6 and 2BR3 to 2BR6.

Closure of contacts 1CR9 and 2CR8, followed by closure of limit switches 2LS1 and 2LS2 at a certain point in the press operating cycle, results in completion of a maintaining circuit around contacts 62$^b$ and 63$^b$ of switches 62 and 63 and the other contacts immediately in series therewith, so that "run" switches 62 and 63 can then be released if desired. Limit switches 2LS1 and 2LS2 open near the end of the press cycle to deenergize coils 1CR1 and 2CR1 of the clutch relays.

A normally open push-button "inch" switch 64 is connected at one end to contacts 60$^a$ of selector switch 60 and is connected at its other end through coil 1CR1 and also through contacts 1CR8 and coil 2CR1, through a second "inch" switch 65, like switch 64, to contact 60$^d$ of switch 60. With selector switch 60 operated to close its contacts 60$^a$ and 60$^d$ and open contacts 60$^b$ and 60$^c$, simultaneous closure of "inch" switches 64 and 65 will result in energization of coils 1CR1 and 2CR1 which will remain energized so long as switches 64 and 65 remain closed. Accordingly, clutch control coil 23 can be energized in "inching" increments to afford corresponding drive of shaft 11 and the press ram. It will be observed that "inching" operation of the ram can be accomplished with the motor 17 running or deenergized with flywheel 19 coasting.

The operation of the system as a whole will now be described in connection with Figs. 1 to 3. When supply lines L1, L2 and L3 are deenergized, transformer 35 will be deenergized and accordingly the various contacts and operating coils of relays and contactors shown in Fig. 3 will assume the respective conditions depicted therefor. The operating positions depicted for various limit switches in Fig. 3 may be assumed to be those which obtain when the press ram is at its upper normal position. Now if lines L1, L2 and L3 are energized it will be observed that due to limit switch 3LS2 being closed release coil 14 will be energized to effect release of friction brake 12—14, and that the control coil 29 of the magnetic particle brake 27 will also be energized, due to energization of coils 1BR1 and 2BR1 of brake relays 1BR and 2BR. If "start" switch 40 is closed motor 17 will then be connected to line L1, L2 and L3 to drive shaft 18 and flywheel 19.

Now assume that it is desired to have the press run through a complete single cycle automatically. Selector switch 60 is then operated to "run" position, wherein contacts 60$^b$ and 60$^c$ are closed and contacts 60$^a$ and 60$^d$ are open. If "run" switches 62 and 63 are in their normal positions depicted, the coils 3CR1 and N1 will be energized. Concurrent operation of switches 62 and 63 to close contacts 62$^b$ and 63$^b$ and open 62$^a$ and 63$^a$ will then result in energization of coils 1CR1 and 2CR1 to complete energizing connections for control coil 23 of magnetic particle clutch 20, as a result closure of contacts 1CR2 to 1CR4 and 2CR2 to 2CR4. The resultant opening of contacts 1CR5 and 2CR5 deenergizes coils 1BR1 and 2BR1 to effect deenergization of control coil 29 of magnetic particle brake 27. Accordingly, the press ram is released from the brakes and is coupled through clutch 20 to shaft 18 to be driven downwardly toward the work.

After an interval of movement of the press ram toward the work, limit switches 2LS1 and 2LS2 close to establish the maintaining circuits for coils 1CR1 and 2CR1 so that "run" switches 62 and 63 may thereafter be released without effecting stopping of the press. It will be noted that release of switches 62 and 63 prior to such closure of limit switches 2LS1 and 2LS2 will result in immediate deenergization of the clutch and in immediate energization of the magnetic particle brake and friction brake.

After the press ram has moved through the bottom of its stroke and has started up again, limit switch 1LS2 opens to deenergize coil N1 of non-repeat relay N. Then if relay N for any reason fails to drop out and close its contacts N2, the following momentary opening of limit switch 1LS1 will deenergize motor 17, clutch 20 and brake release coil 14 to set the friction brake, and will effect following energization of magnetic particle brake. In the interval between the aforedisclosed openings of limit switches 1LS2 and 1LS1, limit switch 3LS1 opens and limit switch 3LS2 closes, but such operation of limit switches 3LS1 and 3LS2 has no effect in normal operation.

Toward the end of upward travel of the press ram limit switches 2LS1 and 2LS2 open to deenergize clutch relay coils 1CR1 and 2CR2 and effect deenergization of control coil 23 of the clutch. Due to maintenance of energization of series coil SR1 during discharge of the residual inductive current from coil 23, reenergization of brake relays 1BR1 and 2BR2 is delayed for an interval. If at the end of the interval contacts SR2 fail to close, closing of limit switch 3LS1 will insure that the energizing connections for the brake relays 1BR and 2BR will be reestablished to effect energization of the magnetic particle brake.

Brake 12—14 will set at any point in the down stroke of the press ram if either of the switches 62 and 63 are released prior to closure of limit switches 2LS1 and 2LS2, as limit switch 3LS2 will be open during that portion of the press operating cycle. However, under normal operation brake 12—14 will not set unless the magnetic flux brake fails and the press ram actually goes past dead center, whereupon limit switch 3LS2 opens to deenergize coil 14.

As will be understood with selector switch 60 in the "run" position only a single cycle of operation of the press ram can be obtained for each operation of the "run" switches 62 and 63 and the latter must be released before succeeding single cycle operations can be effected. It will also be observed that if switch 37 is operated at any point in the automatic single cycle of operation that motor 17 will be deenergized brake 12—14 will set, brake 27 will be energized, and clutch 20 will be afforded the aforedescribed reduced energization to afford braking of shaft 18 and flywheel 19, as long as switches 56 and 59 are held closed. "Inching" operation of the press, when selector switch 60 is operated to close its contacts 60ª and 60ᵇ and open its contacts 60ᵇ and 60ᶜ, has hereinbefore been adequately described.

We claim:

1. The combination with a drive system for a power press or the like having an electric driving motor, a magnetic flux clutch having a control coil, a magnetic flux brake having a control coil and a friction brake having an electromagnetic release coil, of means affording a source of alternating current supply, electroresponsive means energizable to connect the motor to said source, means affording a source of unidirectional current, an electroresponsive brake relay having an operative coil normally open contacts connected in circuit with the control coil of the magnetic flux brake and the unidirectional current source, an electroresponsive clutch relay having an operating coil normally open contacts connected in circuit with the control coil of the clutch and said unidirectional current source and having normally closed contacts connected in circuit with the operating coil of said brake relay and said unidirectional current source, a relay having an operating coil connected in series with said clutch control coil and having normally closed contacts in the circuit inclusive of the normally closed contacts of said clutch relay and the operating coil of said brake relay, a switch connected in parallel with the contacts of the last mentioned relay which is operated to close at a certain point in the press cycle to insure reestablishment of energizing connections for the operating coil of said brake relay in the event the contacts of the last mentioned relay fail to close following deenergization of said clutch control coil, and control means operable to energize and deenergize said electroresponsive means and the operating coil of said clutch relay from said alternating current source.

2. The combination according to claim 1 wherein said control means include a normally closed switch which when opened interrupts supply of current thereto from said source and wherein said clutch control coil has an auxiliary circuit for supplying it with current from said unidirectional source at a reduced level which comprises, connected in circuit with said unidirectional source and in series with said clutch control coil, a normally open switch interlocked with the last mentioned normally closed switch for closure when the latter is opened and vice versa, a resistor, and normally closed contacts operated to open by said electroresponsive means when the latter is energized.

3. The combination according to claim 1 together with at least one other like clutch relay having its normally open contacts connected in series with the like contacts of the other clutch relay, its normally closed contacts connected in parallel with the like contacts of said other clutch relay, and its operating coil connectable in parallel with the operating coil of said other clutch relay by said control means, and together with at least one other like brake relay having its normally open contacts connected in parallel with the like contacts of the other brake relay and its operating coil connected in parallel with the operating coil of said other brake relay.

4. The combination according to claim 1 wherein said brake relay has additional normally closed contacts included with said control means and wherein said control means further includes a switch connected in parallel with the last mentioned contacts and operated by said press at a predetermined point in its cycle to interrupt supply of current to said control means in the event said last mentioned contacts of the brake relay are not then closed.

5. The combination according to claim 4 wherein said control means includes a non-repeat relay having normally open contacts in circuit with the operating coil of said clutch relay and normally closed contacts connected in series with said last mentioned normally closed brake relay contacts and together therewith in parallel with the last mentioned switch.

6. The combination according to claim 5 wherein said brake relay has additional normally open contacts connected in an energizing initiating circuit for the operating coil of said non-repeat relay to prevent its energization in the event the last mentioned contacts fail to close.

References Cited in the file of this patent

UNITED STATES PATENTS

| 2,630,467 | Winther | Mar. 3, 1953 |
| 2,635,200 | Berry | Apr. 14, 1953 |
| 2,636,138 | Few | Apr. 21, 1953 |
| 2,675,507 | Geiger | Apr. 13, 1954 |